(12) United States Patent
Chang et al.

(10) Patent No.: US 10,146,512 B1
(45) Date of Patent: Dec. 4, 2018

(54) FEATURE SWITCHING KITS

(71) Applicant: Twitter, Inc., San Francisco, CA (US)

(72) Inventors: Wayne Chang, San Francisco, CA (US); Jeffrey H. Seibert, Jr., San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 15/250,753

(22) Filed: Aug. 29, 2016

Related U.S. Application Data

(60) Provisional application No. 62/211,552, filed on Aug. 28, 2015.

(51) Int. Cl.
*G06F 9/44* (2018.01)
*G06F 8/20* (2018.01)
*G06F 8/30* (2018.01)

(52) U.S. Cl.
CPC . *G06F 8/24* (2013.01); *G06F 8/30* (2013.01)

(58) Field of Classification Search
None
See application file for complete search history.

(56) References Cited

U.S. PATENT DOCUMENTS

| | | |
|---|---|---|
| 2008/0005287 A1 | 1/2008 | Harvey et al. |
| 2013/0073614 A1 | 3/2013 | Shine et al. |
| 2014/0172557 A1 | 6/2014 | Eden et al. |
| 2014/0229821 A1 | 8/2014 | Abrahami |
| 2014/0365311 A1 | 12/2014 | Eulenstein et al. |
| 2015/0113508 A1* | 4/2015 | Balasubramanian ..... G06F 8/36 717/121 |
| 2015/0248301 A1* | 9/2015 | Shani ...................... G06F 8/60 717/163 |
| 2017/0199807 A1* | 7/2017 | Chang ................. G06F 11/3664 |

OTHER PUBLICATIONS

U.S. Appl. No. 15/256,058, by Jeffrey Fl. Seibert Jr. filed Sep. 2, 2016.

* cited by examiner

*Primary Examiner* — Daxin Wu
(74) *Attorney, Agent, or Firm* — Shumaker & Sieffert, P.A.

(57) ABSTRACT

A system and method for feature switching in software applications. A feature switching action (FSA) is received and at least one user device is identified based on the received FSA. At least one feature switching instruction (FSI) is generated based on the received FSA and the FSI is sent to at least one of the identified user devices. A feature switching instruction response (FSIR) is received from each user device that received a FSI and a feature switching action response (FSAR) is generated based on the received FSIRs.

12 Claims, 11 Drawing Sheets

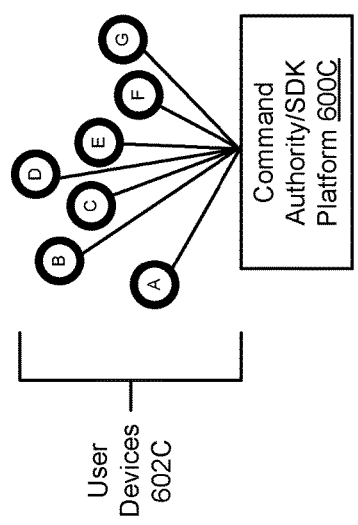

FEATURE SWITCHING KITS

This application claims the benefit of U.S. Provisional Application No. 62/211,552, filed Aug. 28, 2015, the entire contents of which are incorporated herein by reference.

BACKGROUND

A software development kit (SDK) is a set of tools used to create applications for particular platforms. Software application developers often incorporate third-party software development kits (SDKs) into their product to enhance its functionality and marketability.

SUMMARY

In one example, a system and method for feature switching includes defining a plurality of service software development kits (service SDKs), including a first service SDK, wherein each service SDK is associated with a service and includes one or more features associated with the service, developing an application having one or more of the service SDKs, including the first service SDK, and executing the application on a user device, wherein executing includes determining if the service associated with the first service SDK is available and switching off one or more features of the first service SDK if the service is unavailable.

In another example, a method for feature switching in software applications includes receiving a service status report (SSR) from a service provider, determining that a feature adjustment is required based on the received SSR, generating, based on determination, a feature switching action (FSA), sending the FSA to a software development kit (SDK) platform and receiving a feature switching action response (FSAR) from the SDK platform.

In another example, a method for feature switching in software applications includes receiving a service status report (SSR) from a service provider, determining that a feature adjustment is required based on the received SSR, generating, based on the determination, a feature switching action advice (FSAA), sending the FSAA to a command authority for validation, receiving a feature switching action (FSA) from the command authority, and sending a feature switching action response (FSAR) to the command authority.

In another example, a method for feature switching in software applications includes receiving a feature switching action (FSA) from a command authority, identifying at least one user device based on the received FSA, generating at least one feature switching instruction (FSI) based on the received FSA, sending the FSI to at least one identified user device, receiving a feature switching instruction response (FSIR) from the at least one identified user device, generating a feature switching action response (FSAR) based on the received FSIR and sending the FSAR to the command authority.

In another example, a method for feature switching in software applications includes receiving a feature switching instruction (FSI) from a software development kit (SDK) platform, identifying, based on the received FSI, a service SDK identifier, at least one feature identifier, and at least one feature set value, determining that a replacement user interface (UI) skin is required to fulfill the FSI, obtaining, based on the determination, the replacement UI skin, applying the replacement UI skin and updating at least one feature property; generating a feature switching instruction response (FSIR), and sending the FSIR to the SDK platform.

In another example, a method for feature switching in software applications includes receiving, at a device, one or more feature switching instructions (FSIs) from a software development kit (SDK) platform, wherein each FSI includes a service SDK identifier, a feature identifier and a feature set value, wherein each FSI identifies a feature within a service SDK as a function of the service SDK identifier and the feature identifier, applying an adjustment to the respective feature identified by each FSI based on the feature set value in the respective FSI, generating a feature switching instruction response (FSIR), and sending the FSIR to the SDK platform.

In another example, a system includes at least one processor and a computer-readable storage medium storing instructions that, when executed, cause the at least one processor to receive a feature switching action (FSA), identify at least one user device based on the received FSA, generate at least one feature switching instruction (FSI) based on the received FSA, send the FSI to at least one of the identified user devices, receive a feature switching instruction response (FSIR) from the at least one identified user device, and generate a feature switching action response (FSAR) based on the received FSIR.

In another example, a device includes at least one processor and a computer-readable storage medium storing instructions that, when executed, cause the at least one processor to receive, from an external source, one or more feature switching instructions (FSIs), wherein each FSI includes a service SDK identifier, a feature identifier and a feature set value, wherein each FSI identifies a feature within a service SDK as a function of the service SDK identifier and the feature identifier, apply an adjustment to the feature identified by each FSI based on the feature set value in the FSI, generate a feature switching instruction response (FSIR), and send the FSIR to the external source.

In yet another example, a computer-readable storage medium stores instructions that, when executed, cause at least one processor to receive a feature switching action (FSA), identify at least one user device based on the received FSA, generate at least one feature switching instruction (FSI) based on the received FSA, send the FSI to at least one identified user device, receive a feature switching instruction response (FSIR) from the at least one identified user device, and generate a feature switching action response (FSAR) based on the received FSIR.

The feature switching system and method described below provides a modular mechanism for accessing services via service SDKs. This modular mechanism may be used to simplify the addition of services to applications running on user devices, to efficiently introduce both new services and new features in existing services in real-time without interruption and to gracefully handle failure when a service is unavailable or degraded. The system and method becomes even more powerful when combined with a service SDK platform that controls deployment, monitoring and configuration of the service SDKs used in the applications installed on the user device as detailed below. Software developers may access the service SDK platform to include service SDKs in their applications.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 6A shows an example of a degree of granularity granted in feature switching in accordance with one or more aspects of the present disclosure.

FIG. 6B shows an example of a degree of granularity granted in feature switching in accordance with one or more aspects of the present disclosure.

FIG. 6C shows an example of a degree of granularity granted in feature switching in accordance with one or more aspects of the present disclosure.

DETAILED DESCRIPTION

Figure 1:
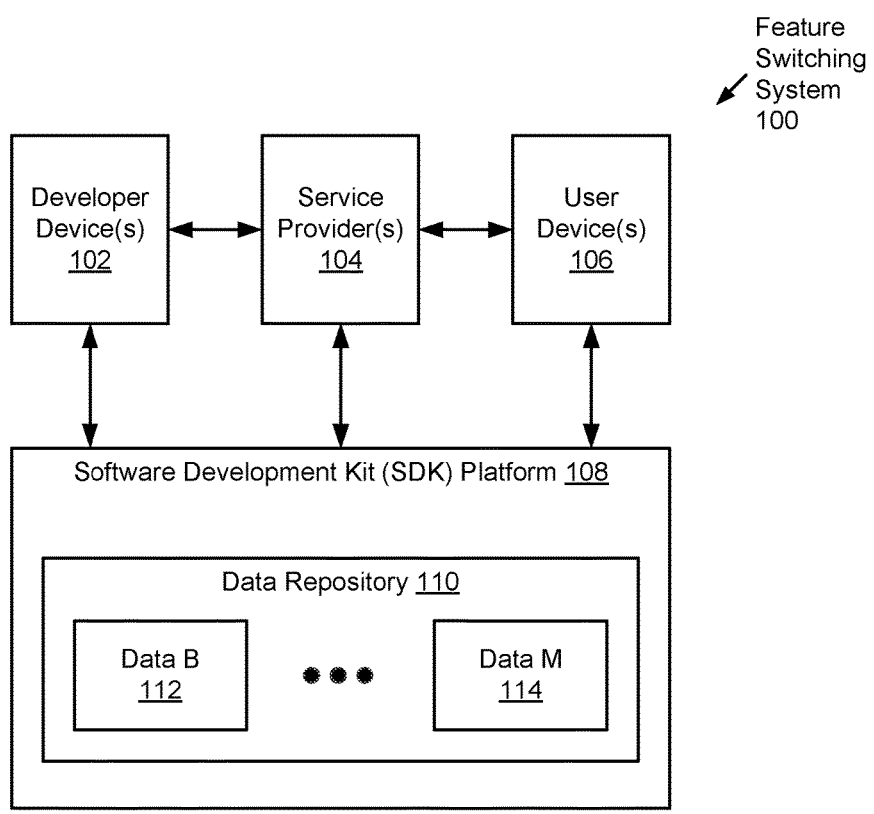
FIG. 1 shows a feature switching system in accordance with one or more aspects of the present disclosure.

Specific aspects of the present disclosure will now be described in detail with reference to the accompanying figures. In the following detailed description of aspects of the present disclosure, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-10, any component description with regard to a figure, in various aspects of the present disclosure, may be equivalent to one or more like-named components described with regard to any other figure. For brevity, descriptions of these components will not be repeated with regard to each figure. Thus each and every example of the components of each figure is incorporated by reference and assumed to be optionally present within every other figure having one or more like-named components. Additionally, in accordance with various aspects of the present disclosure, any description of the components of a figure is to be interpreted as an optional embodiment, which may be implemented in addition to, in conjunction with, or in place of the embodiments described with regard to a corresponding like-named component in any other figure.

Developers often develop applications for user devices (e.g., mobile devices) operating within a network. Such applications, when executed on the user devices, often access services provided by service providers operating on the network via software development kits (SDKs) embedded in or otherwise used by the applications.

Applications distributed to user devices tend to include static code with fixed features. Such an approach simplifies distribution and maintenance of such code at the cost of adaptability. What are described below are example methods and systems for enabling and managing real-time feature switching in deployed software applications via an SDK platform. Such an approach allows the application developer to dynamically add and improve services within their applications.

In one example approach, a developer enables feature switching by including feature switches in the application code. One can use such switches to, for example, slowly enable new features in existing applications or to turn on or off features in response to changing conditions. In one non-limiting example, an application executing on a mobile device may access three different services. For instance, the three services include an analytics service, a logging service and an aggregation service. If one of the services is unavailable, it would be advantageous to be able to disable that feature in the application. In one example approach, the service provider disables the feature via an SDK platform. In another such example approach, a command authority determines if a feature should be disabled and communicates that to the appropriate user devices. In yet another example approach, a processor receives an indication from a service provider that a feature should be disabled. The processor then determines if the feature should be disabled.

FIG. 1 shows a feature switching system (100) in accordance with one or more aspects of the present disclosure. In one or more aspects of the present disclosure, the feature switching system (100) includes developer devices (102), service providers (104), user devices (106), and a software development kit (SDK) platform (108). As shown in FIG. 1, the developer devices (102) and user devices (106) are operatively connected to the service providers (104) and the SDK platform (108). Aside from being operatively connected to the developer devices (102) and the user devices (102), the service providers (104) are also operatively connected to the SDK platform (108). The connections between the various components may be wired and/or wireless, direct or indirect, temporary, permanent and/or intermittent, through a local area or wide area network, or have any other type of connection or a combination thereof. Further, additional and/or alternative connections may exist without departing from the scope of what is described herein. Each of the above components is described below.

Figure 10:
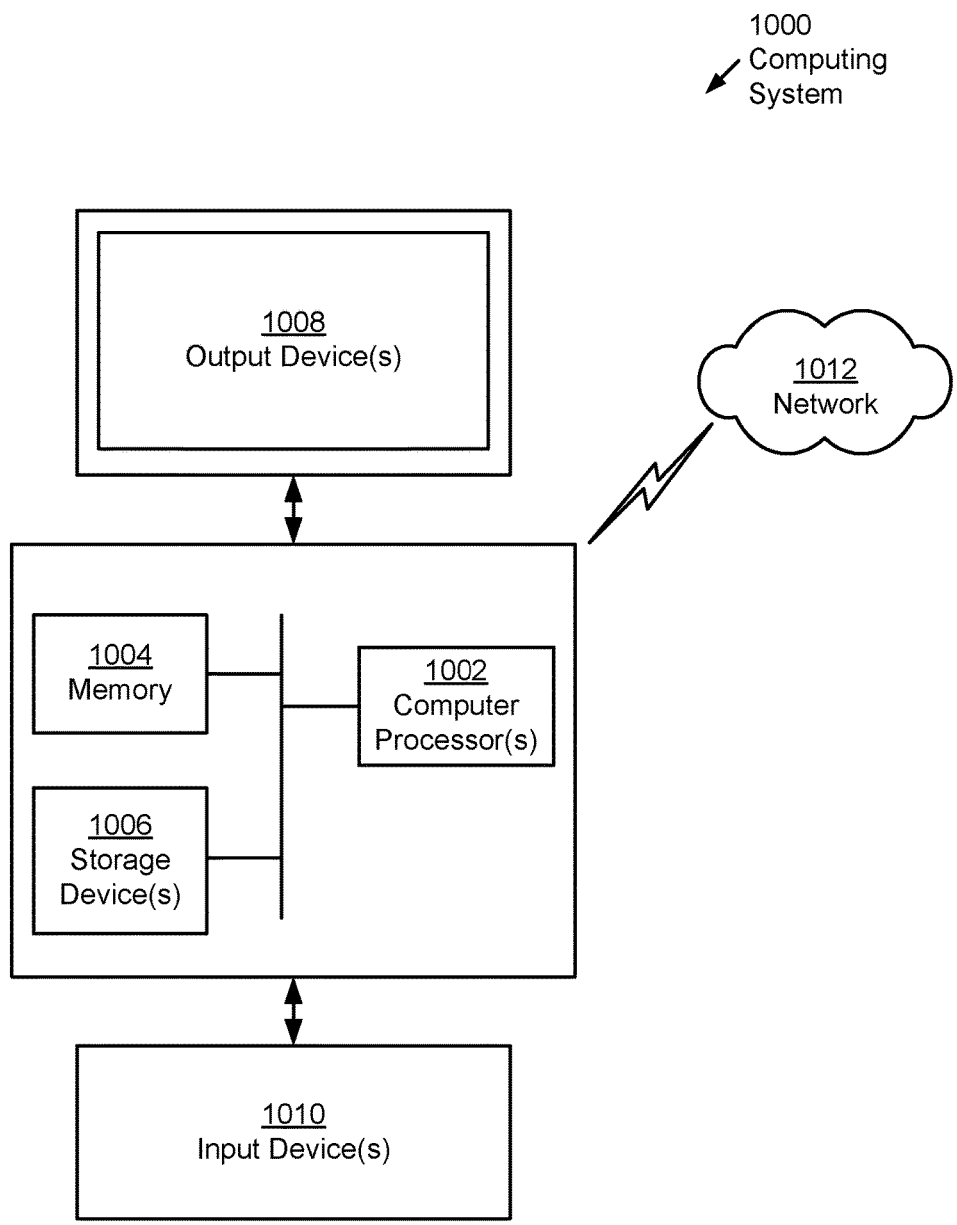
FIG. 10 shows a computing system in accordance with one or more aspects of the present disclosure.

In one or more aspects of the present disclosure, the developer devices (102) and the user devices (106) each correspond to any combination of hardware, software, and/or firmware, such as shown and discussed below with respect to FIG. 10. The developer devices (102) and user devices (106) may correspond to a same type of device or to heterogeneous devices. Further, each of the aforementioned devices may correspond to a single device or multiple devices.

In one or more aspects of the present disclosure, a developer device (102) is a device that is used to develop a software application (discussed below). An application developer is a user or group of users that creates, updates, and/or manages the code of the software application. Further, an application developer and a developer device may additionally manage or authorize real-time changes to releases of the software application as needed. In such a scenario, the developer device may include functionality to enact feature switching through an SDK platform (108). Developer devices are discussed in further detail below and in FIG. 2A.

The software application is any computer program product that is developed by an application developer. The term software application may include different versions and/or editions of the same software application. In one or more aspects of the present disclosure, the software application includes multiple features. Each feature is a distinct attribute of the software application that may or may not be transparent to the end-user operating the user device. In other words, the features of the software application may be observable to the end-user; or alternatively, the features of the software application may be hidden from the end-user. For example, a feature represented as a displayed component in a graphical user interface (GUI) is a feature that is observable to the end-user. In another example, a feature that impacts the behavior of a provided service, such as only impacting the provided content or data utilized by the software application, is a feature that is hidden from the end-user.

In one or more aspects of the present disclosure, a user device (106) is a device used by market users of the software application. A market user is a customer of the software application. For example, the market user may be a purchaser of the software application and/or an entity that acquires a general released version of the software application. Furthermore, the market user utilizes the software application per its intended use. User devices are discussed in further detail below and in FIG. 2B.

Continuing with FIG. 1, in one or more aspects of the present disclosure, each service provider (104) may execute on one or more computing devices (e.g., a server, a mainframe, a personal computer (PC), a laptop, etc.) that may not be of the same type or located at the same physical site. Each service provider (104) provides one or more services, functions, content, or capabilities that can be requested by a computing device (e.g., user device (106)) and/or by a software application external to the service provider (104). Furthermore, each service provider (104) may provide notifications to application developers (e.g., via a developer device and/or via the SDK platform) pertaining to the availability and/or functionality of the provided services, functions, content, or capabilities.

As shown in FIG. 1, the developer devices (102), the service providers (104), and the user devices (106) are connected to a SDK platform (108). In general, the SDK platform (108) corresponds to hardware, software, firmware, or a combination thereof that provides support services for SDKs. For example, the SDK platform may provide a marketplace for SDKs and provide server side services for executing SDKs Often, an application operating in one of user devices 106 in system 100 will have many different SDKs. In such a situation, it can be advantageous to manage each SDK from a single platform. One such example platform 108 is shown in FIG. 1. In one example approach, feature switching may be a core feature of SDK platform 108. Such an approach is advantageous because the approach reduces complexity for the application developer and for the SDK providers that are contributing to the platform by providing a single point of SDK management. In other words, an SDK developer may create an SDK and send the SDK to the SDK platform. The SDK platform may provide SDK marketplace services, such that an application developer may purchase or otherwise obtain the SDK and incorporate the SDK into a software application. An SDK is a set of software development tools that assist in the creation of software applications. Additionally, in one example approach, the SDK platform (108) includes functionality to track the deployment of SDKs across user devices (106). That is to say, the SDK platform includes functionality to determine which SDKs, and subsequently, which features associated with a software application, are in each connected user device.

In one example approach, the SDK platform (108) may also provide an application marketplace for software applications. An application market is a virtual network space, supported by hardware and software that connects consumers of software applications to developers of software applications, and facilitates the exchange of software applications. In at least some example approaches, the application market is a public market that is accessible via the Internet.

Continuing with the SDK platform (108), the SDK platform (108) includes a data repository (110). The data repository (110) is any type of storage unit and/or device (e.g., a file system, database, collection of tables, or any other storage mechanism) for storing data. Further, the data repository (110) may include multiple different storage units and/or devices. The multiple different storage units and/or devices may or may not be of the same type or located at the same physical site. The data repository (110) includes functionality to store one or more datum (112, 114), which, in one or more example approaches, may include unprocessed and processed information.

Unprocessed data is raw data that is gathered from the SDKs embedded in the software application that is, in turn, executing on the user device(s). For example, unprocessed data may include, but is not limited to, for each SDK in the software application: an amount of time in which each feature is executed, identification of the subset of features executed, and the frequency in which the associated service has been used/accessed. A subset as used in this application includes all, part, or none. Thus, a subset of features of an SDK may be all the features of the SDK, part of the features of the SDK, or none of the features of the SDK. Unprocessed data may also include, representing an overview of the SDK platform and/or the feature switching system entirely: the number of user devices with a particular software application, SDK, and/or feature installed, the number of user devices running a specified operating system (OS), the general geographical location the software application is executing at, the frequency of which the software application has been opened, identification of which user devices favored which SDKs and/or features, and any other unprocessed data.

Processed data may include statistics or metrics about the unprocessed data. For example, processed data may include totals and/or proportions. The totals may include: the total elapsed execution time of the software application, SDKs, and features, the total number of user devices within a specified geographic region (e.g., city, state, country, etc.), and the total number of users (e.g., user devices) expressing favoritism towards a particular service, feature, or alternative. Proportions, which includes the conveyance of data through percentages and/or rates, may include: the amount of execution time pertaining to a feature or a SDK/service in comparison to the total amount of time the software application has been executing, the distribution of user devices executing the software application across various definable geographic locations, and the rate of users (e.g., user devices) actively accessing particular services within a specified period of time (e.g., daily, weekly, monthly, etc.).

The above discussion is representative of only a few types of unprocessed and processed data that may be stored in the data repository (110). Additional and/or alternative unprocessed and processed data may be collected and/or exist without departing from what is described herein.

Figures 2A, 2B, 2C:
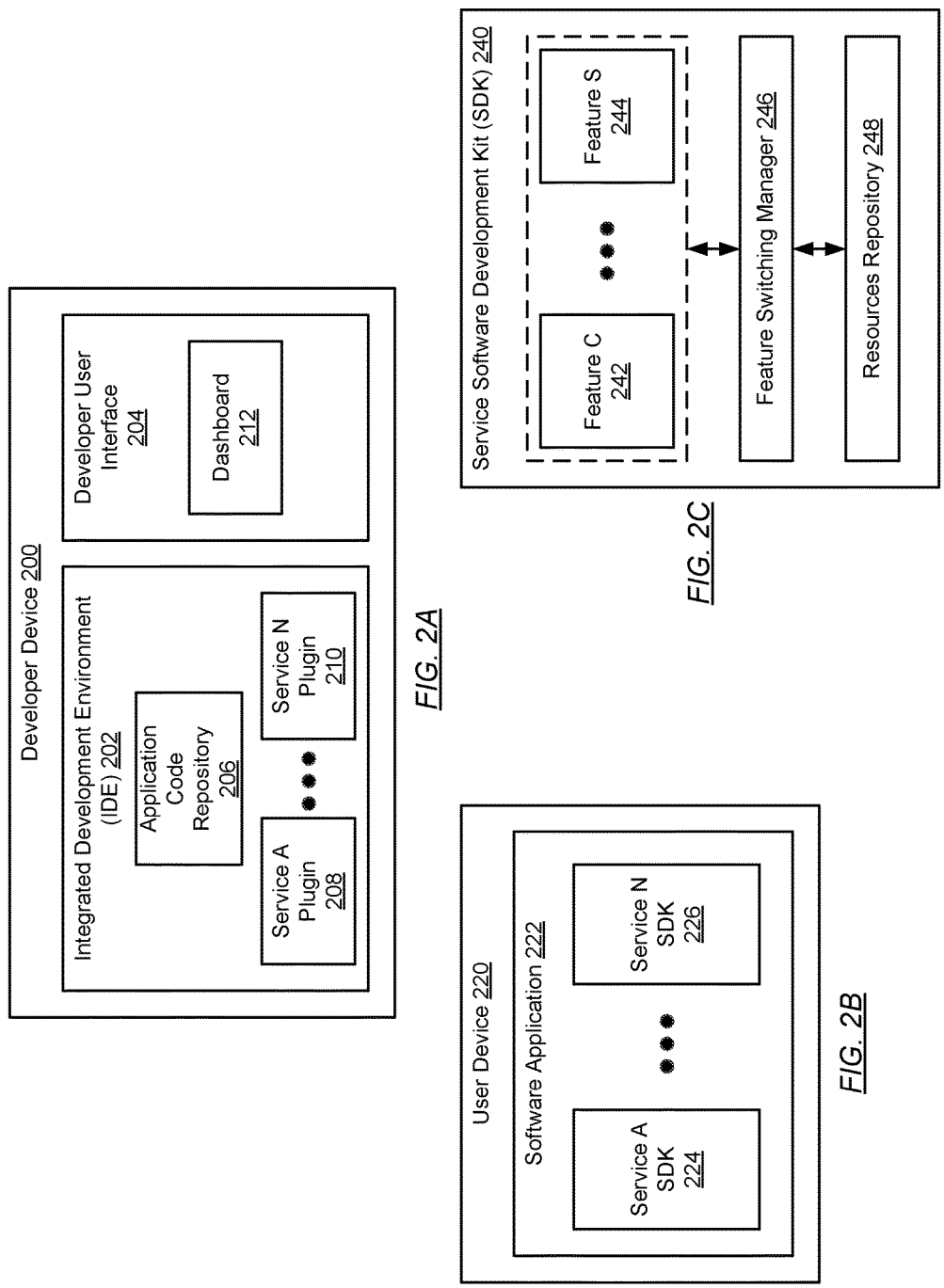
FIG. 2A shows a developer device in accordance with one or more aspects of the present disclosure.
FIG. 2B shows a user device in accordance with one or more aspects of the present disclosure.
FIG. 2C shows a service software development kit (SDK) in accordance with one or more aspects of the present disclosure.

FIG. 2A shows a developer device (200) in accordance with one or more aspects of the present disclosure. In one or more example approaches, the components of FIG. 2A may be implemented in hardware, software, firmware, or a combination thereof. As shown in FIG. 2A, the developer device (200) may include an integrated development environment (IDE) (202) and a developer user interface (UI) (204). Each of these components is discussed below.

The IDE (202) is a collection of one or more tools that facilitates the development of a software application. For example, the tools in the IDE (202) may include tools, such as a code editor, compiler, debugger, and other tools used in the development of a software application. In one or more example approaches, the IDE (202) includes an application code repository (206), and one or more service plugins (208, 210). The application code repository (206) is a data repository for storing application source code, a compiled binary, intermediate object code, or any other type of code. Each of the service plugins (208, 210) is an extension to the IDE that connects to their respective service (discussed above). Each of the service plugins (208, 210) may assist in adding their respective SDK to the software application and communicating with the respective service to obtain data from the service.

The developer UI (204) is an interface (e.g., graphical user interface and/or application programming interface) for the developer device (200) that facilitates access to the SDK platform. For example, the developer UI (204) may include interface widgets and functionality to receive, directly or indirectly, from the application developer, the software application, parameters to identify user devices that are running the software application, and parameters for enabling and managing feature switching in real-time at any granularity. In one or more example approaches, the developer UI (204) includes a dashboard (212). In one or more example approaches, the dashboard (212) includes the presentation of data resulting from the employment of services provided. Referring to the analytics service example (discussed above), the dashboard (212) may include charts, graphs, and other GUI widgets to present analytics.

FIG. 2B shows a user device (220) in accordance with one or more aspects of the present disclosure. In one or more example approaches, the components of FIG. 2B may be implemented in hardware, software, firmware, or a combination thereof. As shown in FIG. 2B, the user device (220) may include a software application (222) (discussed above). The software application (222) on the user device (220) is a version of the software application for use by the market user. In one or more example approaches, the software application (222) includes one or more service SDKs (224, 226). The service SDKs (224, 226) each includes functionality to gather data pertinent to, and relay that data towards, their respective services. Using the analytics service example mentioned earlier, the software application (222) includes an analytics service SDK amongst the service SDKs (224, 226) embedded within. Subsequently, the analytics service SDK includes functionality to gather data regarding usage of the software application (222) on the user device (220), as well as the functionality to forward that usage data to the analytics service.

While FIGS. 2A and 2B show a configuration of components, other configurations may be used without departing from what is described herein. For example, various components may be combined to create a single component. As another example, the functionality performed by a single component may be performed by two or more components.

FIG. 2C shows a service SDK (240) in accordance with one or more aspects of the present disclosure. As shown in FIG. 2C, the service SDK (240) may include one or more features (242, 244), a feature switching manager (246), and a resources repository (248). Each of these components are discussed below.

In one or more example approaches, the service SDK (240) includes one or more features (242, 244). As mentioned above, the one or more features (242, 244) are representative of the distinct attributes of a software application; more so, features are the distinct segments defining a provided service used within the software application. Further, a feature may be interacted with via a binary and/or through a variable fashion. In other words, in one embodiment, the feature may be toggled to enable or disable (e.g., binary states) its function in the provided service and subsequently, the software application. In another embodiment, the feature may variably restrict its influence or contribution to the data/content utilized by the software application. A feature may impact its respective service through any other mechanism without departing from what is described herein.

In one or more example approaches, the service SDK (240) includes a feature switching manager (246). In one or more example approaches, the feature switching manager (246) is software construct serving as a management system purposed with executing received feature switching instructions (FSI) (discussed below). The feature switching manager (246) is the main body that implements the adjustments specified in the FSI and handles the employment of resources (i.e., UI skins, images, fonts, etc.) that are essential towards completing a feature switching adjustment. Further, the feature switching manager (246), in one or more example approaches, reserves the functionality to update the properties of a feature (242, 244) (discussed below) based on the outcome of executing the received FSI.

In one or more example approaches, the service SDK (240) includes a resources repository (248). The resources repository (248) is any type of storage unit and/or device (e.g., a file system, database, collection of tables, or any other storage mechanism) for storing data. Further, the resources repository (248) includes functionality to store resources (e.g., UI skins, images, etc.) critical to the successful execution of feature switching adjustments in one or more example approaches.

Figure 3B:
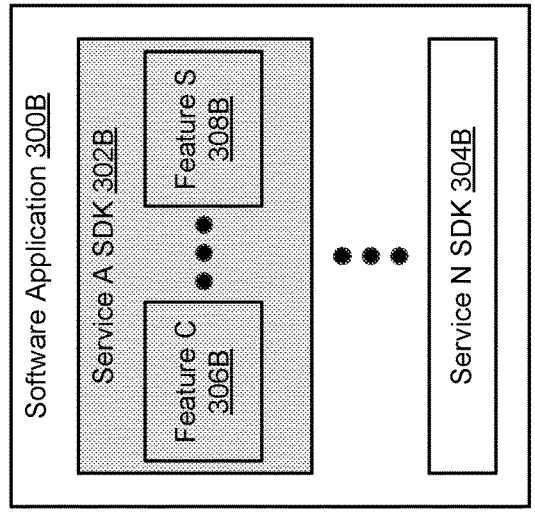
FIG. 3B shows an example of a degree of granularity granted in feature switching in accordance with one or more aspects of the present disclosure.
Figure 3A:
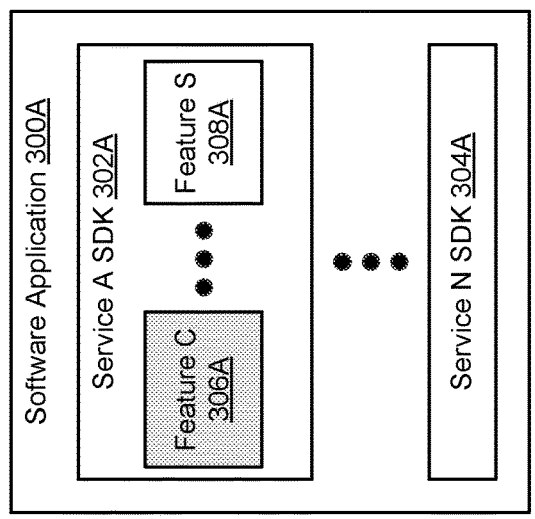
FIG. 3A shows an example of a degree of granularity granted in feature switching in accordance with one or more aspects of the present disclosure.

FIGS. 3A-3B show varying examples of degrees of granularity granted in feature switching, with respect to targeting attributes of a software application, in accordance with one or more aspects of the present disclosure. Further, each example degree of granularity portrays like-named components common within each example. These common components include: (i) the software application (300A, 300B); (ii) one or more service SDKs (302A, 302B, 304A, 304B) providing backend functionality of services used in the software application; and (iii) one or more features (306A, 306B, 308A, 308B) that comprise the services, functions, contents, or capabilities associated with a service SDK. In the example presented in FIG. 3A, it is shown that feature switching can target a subset of features associated with a provided service. For example, due to some circumstance, a command authority (e.g., application developer, developer device, a separate system 100 computer, a processor in the SDK platform) decides to disable one feature (306A), such as a particular payment option amongst a plurality of payment options, provided within a service such as a payment service. The example in FIG. 3B demonstrates that feature switching can extend beyond just features, thus also being capable of targeting a subset of service SDKs (302B) as well. Service SDKs may require disablement in response to exceeding a set threshold of downtime experienced at the service provider end.

FIGS. 4A-5 and 7 show flowcharts in accordance with one or more aspects of the present disclosure. While the various steps in these flowcharts are presented and described sequentially, one of ordinary skill will appreciate that some or all of the steps may be executed in different orders, may be combined or omitted, and some or all of the steps may be executed in parallel. Furthermore, steps may be performed actively or passively. For example, some steps may be performed using polling or be interrupt driven in accordance with one or more aspects of the present disclosure. By way of an example, determination steps may not require a processor to process an instruction unless an interrupt is received to signify that a condition exists in accordance with one or more aspects of the present disclosure. As another example, determination steps may be performed by performing a test, such as checking a data value to test whether a value is consistent with the tested condition in accordance with one or more aspects of the present disclosure.

Figure 4A:
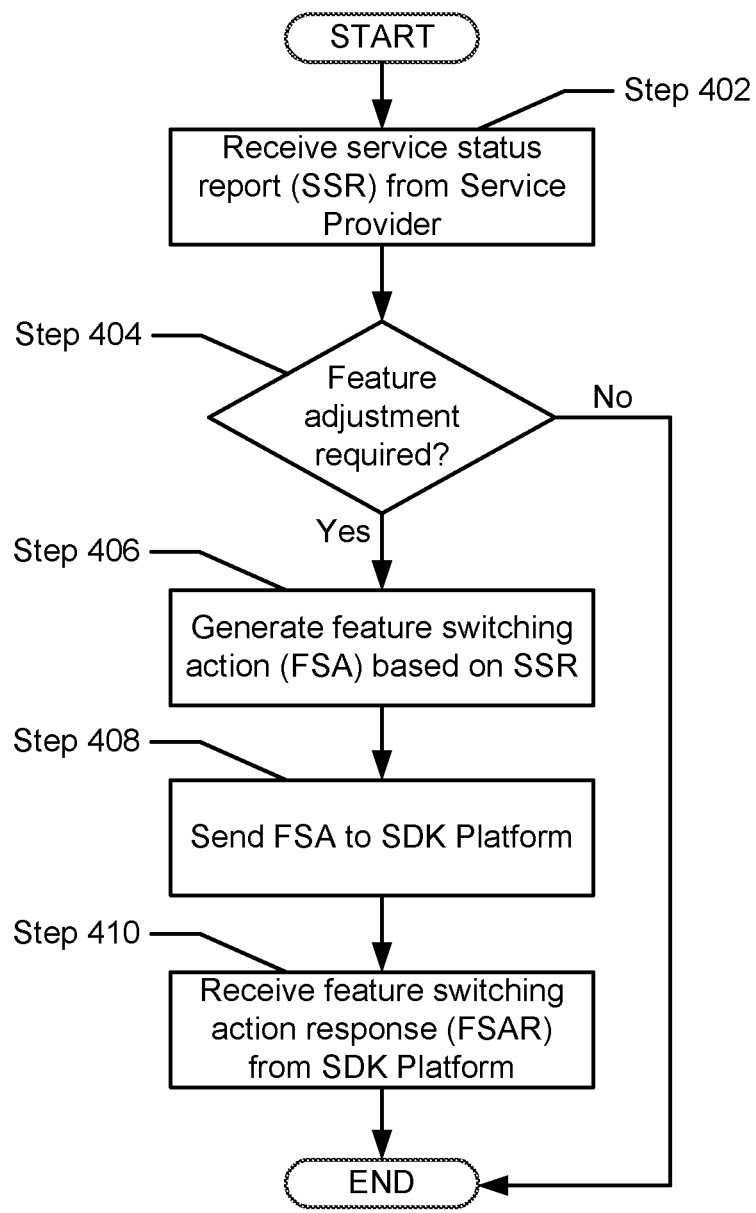
FIG. 4A shows a method for generating a feature switching action (FSA) in accordance with one or more aspects of the present disclosure.

FIG. 4A shows a method for generating a feature switching action (FSA) in accordance with one or more aspects of the present disclosure. In Step 402, a service status report (SSR) is received from a service provider. In one or more example approaches, a SSR may be implemented as a file or stream of data that is periodically generated and transmitted by a service provider. In this application, a file refers to data that is stored in a storage device (see e.g., 1006 in FIG. 10) within its host computing system (see e.g., 1000 in FIG. 10) and can be later accessed by a software application for processing. A stream of data (or data stream) refers to data that is stored temporarily in buffers associated with the hardware corresponding to the communication protocol the data is encoded in. To exemplify the various formats that which data may be delivered, in one example, the service provider may transmit different granularities of binary data (e.g., ones and zeros) to disclose the different granularities of states (e.g., on and off, available and unavailable) associated with its provided service. In one example approach, the service provider may transmit a single binary digit or bit that describes the state of its service as a whole (e.g., 1—service is up, 0—service is down). In another example approach, the service may transmit a sequence of binary bits (e.g., bytes) to provide a more detailed outlook on the state of its service, thus sharing the individual states of each feature or attribute comprising its service (e.g., 111—all features are up, 010—the first and third features are down). Additionally, the service provider may offer higher degrees of granularity with respect to the state of its provided service. Instead of disclosing one of two possible states, as is the limitation of transmitting binary data, the service provider, in one or more example approaches, may deliver an SSR that includes metrics that further detail the performance and reliability of its service and/or its attributes. In doing this, the service provider allows for the customization of the behavior that which feature switching occurs in the software application. In one or more example approaches, this customization is carried out through comparison of the received metrics with preset thresholds or benchmarks, to which meeting any definable condition results in triggering a feature switching action (FSA) or not.

In Step 404, a determination is made whether information provided in the received SSR warrants that adjustment(s) of software application attributes take place. In one example approach, an adjustment may comprise enabling or disabling at least a part of a service, thereby prompting a change in the software application user interface that is observable to the end-user. In another example approach, an adjustment may comprise redefining the behavior of a service that is being provided to a user device. Said another way, a service may provide content or data to a software application fed from numerous sources and an adjustment affecting the behavior of a provided service would, for example, alter the contribution of each source towards that provided data. In yet another example approach, an adjustment may refer to introducing an additional source in contributing towards the data provided, followed by the redistribution of contributions between the existing and new sources. In another example approach, an adjustment may comprise a change in the configuration of service settings to conform to end-user preferences, which may or may not trigger visible modifications to the software application user interface in addition to service behavioral changes. Other processes may comprise of an adjustment without departing from what is described herein. Returning to the discussion of FIG. 4A, if at least one attribute or feature of a service is identified as requiring an adjustment, the process proceeds to Step 406; otherwise, it is deemed that feature switching is unnecessary and the process ends. In one or more example approaches, the determination step may include: (i) processing the SSR, received in Step 402, to obtain quantifiable indicators revealing the most recent state of the provided service; and (ii) comparing those indicators to corresponding reference values, resulting in action or inaction. In this application, processing of the SSR may denote any technique, such as parsing, bitwise operations, and/or any existing or new variants of data mining that may facilitate the separation of the afore-mentioned indicators, on the basis of any specified granularity, from the SSR.

Continuing discussion of FIG. 4A, in Step 406, based on the determination presented in Step 404, a FSA is generated to address information in the received SSR, which discloses the state of the provided service. In one or more example approaches, the FSA may specify the following information items: (i) a unique service provider identifier, associated with the service provider from which the SSR originated, and used by the SDK platform to identify the appropriate service SDK in its instructions to the user device(s) (discussed below); (ii) one or more feature identifier and set value pairs, each presenting a feature in the designated service SDK and the desired adjustment applied to that feature; and (iii) one or more unique user device identifiers corresponding to the set of user devices the adjustments are targeted to affect.

In Step 408, the FSA, generated in Step 406, is sent to the SDK platform. In Step 410, following the completion of processes shown and discussed below with respect to FIGS. 5 and 7, a feature switching action response (FSAR) is received from the SDK platform. Within the FSAR, in one or more example approaches, the SDK platform discloses the outcome resulting from the execution of the requested adjustment to the software application. The FSAR is discussed in further detail below and in FIG. 5.

Figure 4B:
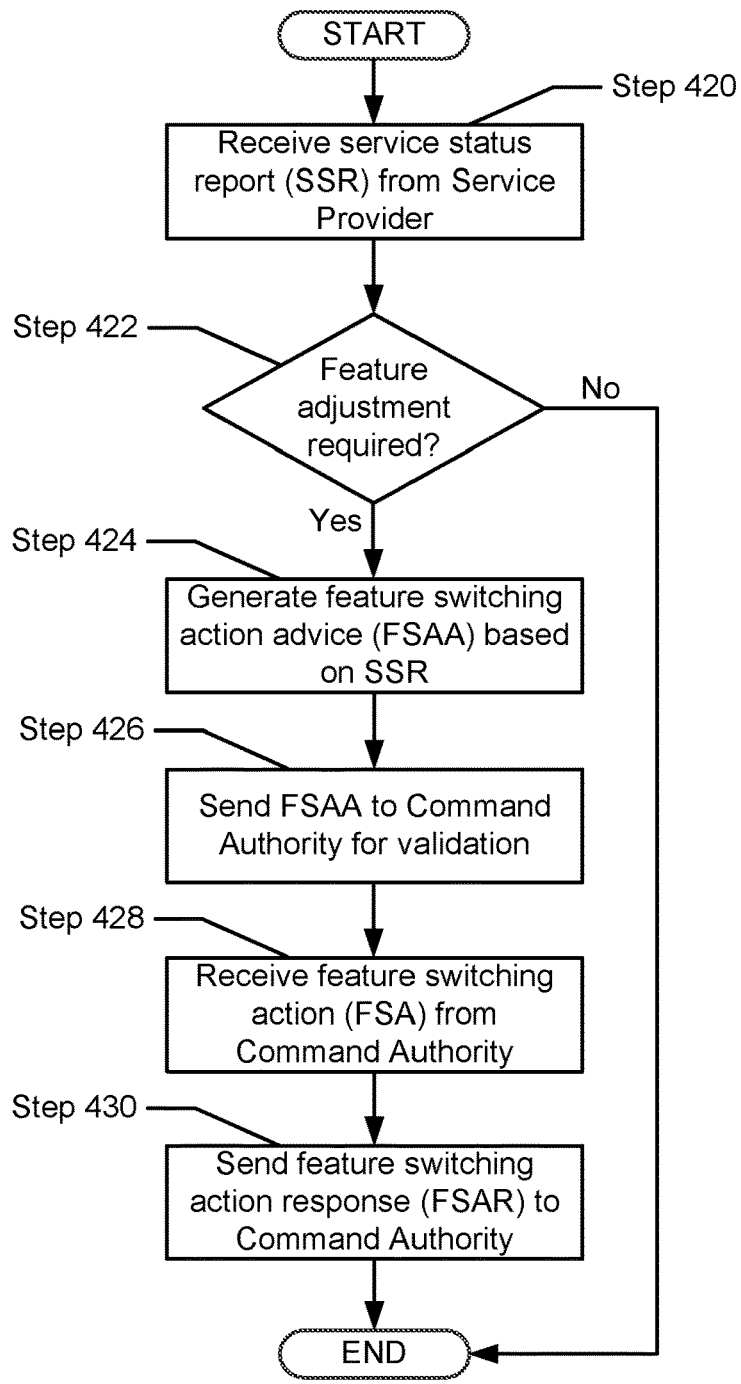
FIG. 4B shows a method for generating a feature switching action advice (FSAA) in accordance with one or more aspects of the present disclosure.

FIG. 4B shows a method for generating a feature switching action advice (FSAA) in accordance with one or more aspects of the present disclosure. In Step 420, a service status report (SSR) is received from a service provider. Further, in Step 422, a determination is made whether information in the received SSR warrants that adjustment(s) of software application attributes take place. If at least one attribute or feature of a service is identified as requiring an adjustment, the process proceeds to Step 424; otherwise, it is deemed that feature switching is unnecessary and the process ends. For discussion detailing Steps 420 and 422, refer to Steps 402 and 404 in FIG. 4A (discussed above) as the former steps are substantially similar to the latter steps.

In Step 424, based on the determination presented in Step 422, a feature switching action advice (FSAA) is generated by the SDK platform. The FSAA serves to propose a recommended action, to convey to a command authority (e.g., application developer, developer device, a separate system 100 computer, a processor in the SDK platform, based on the indicators extracted from processing the SSR (discussed above). Moreover, presentation of the FSAA to the command authority may vary. In one example approach, if it is deemed necessary that all recommendations be approved by the application developer, the FSAA is an interactive dialog that pops up in the developer UI (204 in FIG. 2A). In another example approach, the FSAA is file or data stream that can be further processed and validated by a command authority.

Proceeding along, in Step 426, the FSAA, generated in Step 424, is sent to the command authority (e.g., application developer, developer device, a separate system 100 computer, a processor in the SDK platform. Following the processing of the FSAA by the command authority, a FSA is received from said command authority specifying the allowance, rejection, or replacement of the proposed action given by the SDK platform. Therefore, if an allowance is granted, the SDK platform, for example, may receive a FSA that instructs the SDK platform to implement the recommended action. Conversely, a FSA may be received instructing the SDK platform to not pursue the recommendation and stand idle if a rejection is issued. Additionally, a received FSA may include an alternative action that the command authority wishes to implement in contrast to the proposed action presented in the FSAA. Finally, in Step 430, following the completion of processes shown and discussed below with respect to FIGS. 5 and 7, a FSAR is transmitted to the command authority. The FSAR is discussed in further detail below and in FIG. 5.

Figure 5:
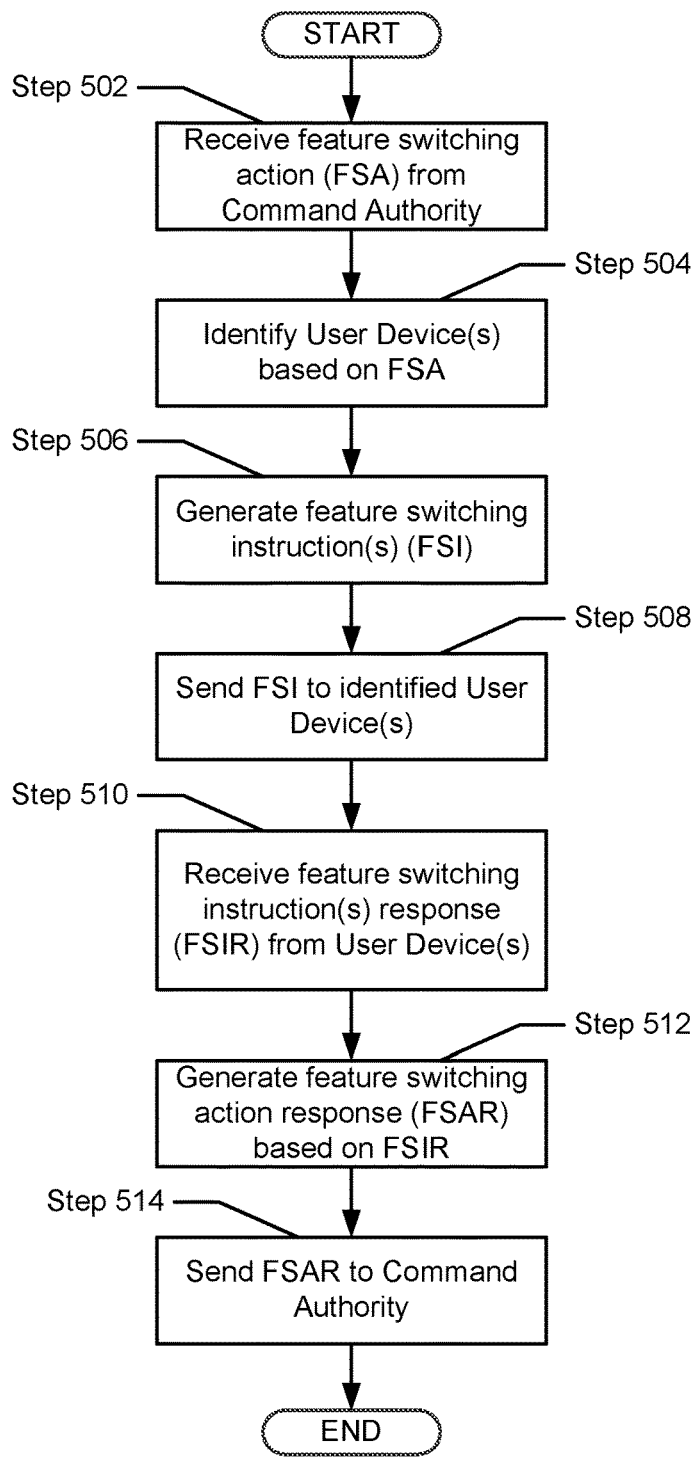
FIG. 5 shows a method for generating a feature switching instruction (FSI) and a feature switching action response (FSAR) in accordance with one or more aspects of the present disclosure.

FIG. 5 shows a method for generating a feature switching instruction (FSI) and a feature switching action response (FSAR) in accordance with one or more aspects of the present disclosure. In Step 502, a feature switching action (FSA) (discussed above) is received from a command authority. In Step 504, a set of user devices is identified using the FSA. In one example approach, using the tracking of deployed SDKs functionality of the SDK platform (see e.g., discussion of SDK platform with regards to FIG. 1), a command authority may identify user devices by determining which are running applications with an SDK and/or a feature addressed by the FSA. In another example approach, the identification of user devices may be determined prior to the process shown in FIG. 5.

In Step 506, one or more feature switching instructions (FSIs) are generated based on the FSA. In one example approach, each FSI may be interpreted differently by user devices with differing architectures, and therefore, each FSI may be generated with consideration to the embedded hardware and/or software specifications on the particular user device in mind. For example, if different operating systems (OS) (i.e., iOS®, Android™, Windows®, etc.) are found running on the set of user devices that are targeted to apply an adjustment of a feature, various FSI are generated utilizing the programming language native to each OS. (iOS is a registered trademark of Cisco Systems, Inc., Android is a trademark of Google, Inc., and Windows is a registered trademark of Microsoft Corporation). Furthermore, in one example approach, the FSI may include, but is not limited to, the following information items: (i) a unique service SDK identifier, derived from the unique service provider identifier within the received FSA, and used by the software application, in the user device, as to which service to perform the adjustment(s); (ii) one or more feature identifier and set value pairs identified in the received FSA (discussed above); and (iii) a user interface (UI) skin index, which is used by the feature switching manager, pertaining to the service SDK matching the unique service SDK identifier, in the user device to obtain one of various UI skins stored in the resources repository (see e.g., 248 in FIG. 2C) included in the service SDK. In another example approach, instead of a UI skin index, the FSI may alternatively include a UI skin itself, further implying that in one example approach, UI skins may not be a resource available locally by the corresponding service SDK.

In Step 508, the one or more FSIs, generated in Step 506, are transmitted to the set of user devices identified in Step 504. Further, in Step 510, following the completion of processes shown and discussed below with respect to FIG. 7, one or more feature switching instruction responses (FSIR) are received from the identified user devices (Step 504). Within the FSIR, in one or more example approaches, each identified user device discloses the outcome resulting from the execution of the requested adjustments in the releases of the software application. The FSIR is discussed in further detail below and in FIG. 7.

In Step 512, a feature switching action response (FSAR) is generated based on the aggregate FSIR received from the various identified user devices. In one or more example approaches, the FSAR entails a summary of the outcomes resulting from the execution of the requested adjustments on each identified user device. By way of an example, the FSAR may provide information corresponding to the particular outcome recorded by each of the identified user devices (Step 504). In another example, the FSAR may only highlight information from a subset of the identified user devices, which have experienced undesired outcomes (e.g., failures, errors). Further the FSAR may be transmitted as a file in one example approach, whereas it may be transmitted as a data stream in another example approach. The transmission of the FSAR to a command authority takes place in Step 514.

FIGS. 6A-6C show varying examples of degrees of granularity granted in feature switching, with respect to the targeting of user devices, in accordance with one or more aspects of the present disclosure. Further, each degree of granularity shown portrays like-named components common within each example. These common components include: (i) a command authority/SDK platform component (600A, 600B, 600C), stressing that the targeting of user devices may be determined by either the command authority (e.g., application developer, developer device) or the SDK platform; and (ii) a representation of user devices (602A, 602B, 602C) that are executing the involved software application. In the example presented in FIG. 6A, it is conveyed that the command authority or SDK platform (600A) is capable of targeting an individual user device. This case may occur, for example, when the presentation of adjustments, specifically with regard to content and data, may be tailored to the observed activities and preferences of the individual user. Moreover, FIG. 6B shows that targeting can be definable to a subset of user devices. An example of this scenario may include the performance of analytics on experience data gathered by the service SDK in each user device, thereby prompting the formation of sets of user devices (e.g., users) that exhibit similar behavior or share the same hardware and/or software specifications. Adjustments formulated based on those commonalities are then directed to those sets. Finally, in FIG. 6C, the command authority or SDK platform (600C) includes functionality to target all user devices running the associated software application. An event triggering an action affecting all user devices, such as the hacking, and subsequent security breach, of a service, serves to exemplify a condition where all users must be safeguarded.

Figure 7:
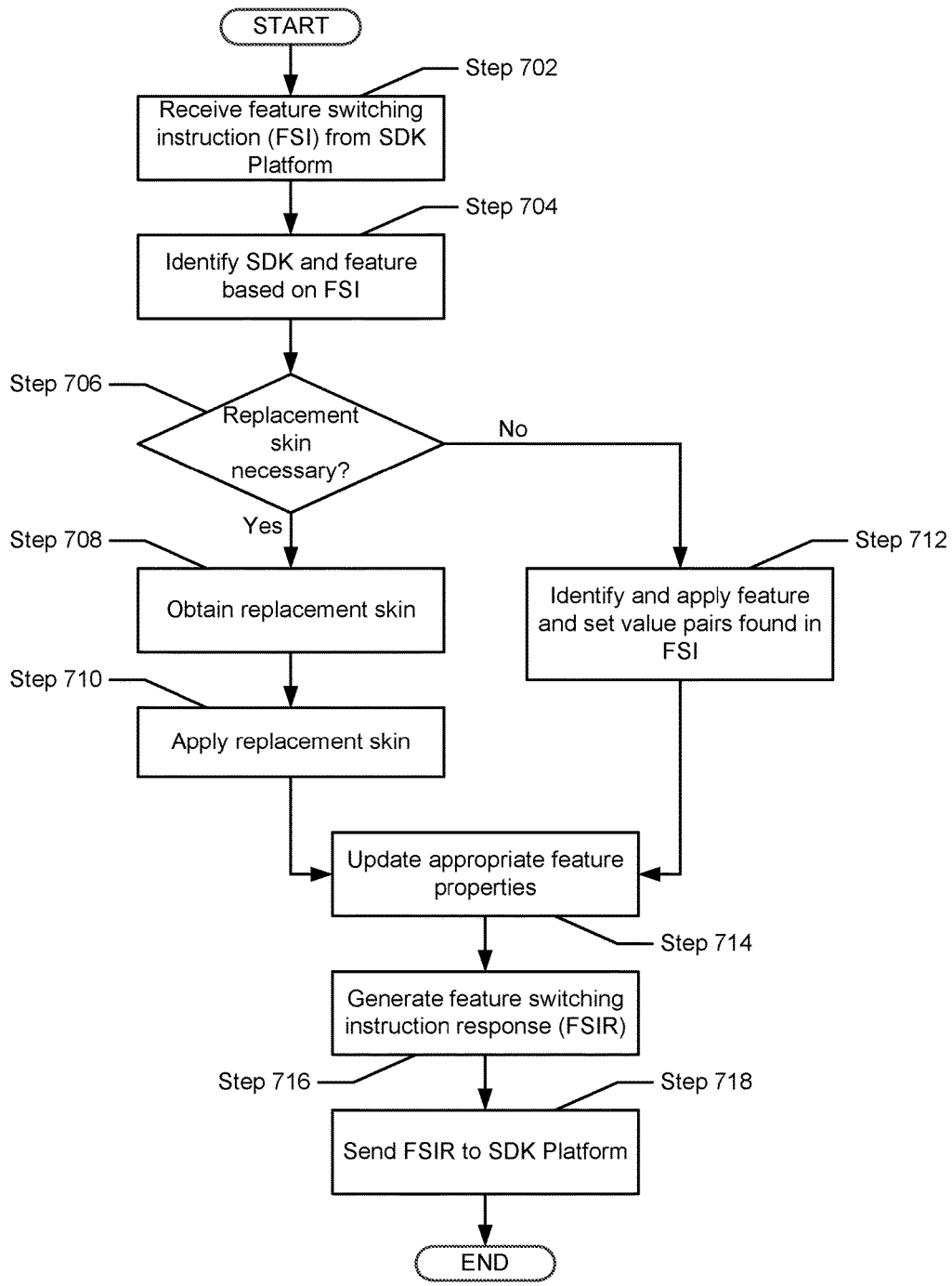
FIG. 7 shows a method for generating a feature switching instruction response (FSIR) in accordance with one or more aspects of the present disclosure.

FIG. 7 shows a method for generating a feature switching instruction response (FSIR) in accordance with one or more aspects of the present disclosure. In Step 702, a feature switching instruction (FSI) (discussed above) is received from the SDK platform. In Step 704, processing is done on the received FSI to identify at least the service SDK the instruction is intended for, and one or more feature and set value pairs detailing the instructions that need to be executed on a per feature basis. In one example approach, each feature and set value pair may be presented as a tuple of information consisting of a feature identifier and a feature set value, where the feature set value represents a quantifiable adjustment to the feature associated with the feature identifier. A quantifiable adjustment, for example, may include, but is not limited to: (i) a binary indicator referencing the state (e.g., on or off) that is to be set on a feature; or (ii) a variable, numerical indicator referencing a set amount, a proportion, a percentage, etc. In one or more example approaches, processing refers to the interpretation of the FSI by the feature switching manager of the intended service SDK. In Step 706, a determination is made whether information in the received FSI warrants the necessity of a replacement UI skin (e.g., resources) to fulfill the execution of the instruction. If an adjustment is presented that affects the user interface of the software application, the process proceeds to Step 708; otherwise, it is deemed that any observable change in the user interface is unnecessary, and the process forwards to Step 712. In Step 708, based on the determination presented in Step 706, a replacement UI skin is obtained. As mentioned above, in one example approach, the received FSI may include a replacement UI skin. In another example approach, the received FSI may alternatively include a replacement UI skin index, which can be used to search for and obtain a replacement UI skin associated with the index, amongst a plurality of UI skins, included within the resources repository (see e.g., 248 in FIG. 2C) of the identified service SDK (Step 704). The obtained replacement UI skin is then applied to the user interface of the software application in Step 710. Alternatively, the determination presented in Step 706 may disclose that the received FSI (Step 702) does not necessitate a replacement UI skin (or other resources) to complete the specified adjustment(s). Hence, in Step 712, based on the aforementioned determination, at least one feature and set value pair (discussed above) is identified from the FSI and applied towards fulfilling feature switching amongst the software application.

In Step 714, whether a replacement UI skin is required or not, following either path of the determination, properties of the affected feature(s) are updated accordingly. Properties of a feature, in one or more example approaches, may include, but are not limited to: (i) visibility—defining whether the feature should be accessible or inaccessible to the end-user; (ii) state—defining whether the feature is enabled or disabled as viewed by the components of the feature switching system (see e.g., FIG. 1); and (iii) value—defining the current set value adopted by the feature, either as a default set value or a set value presented by an instruction. In Step 716, a feature switching instruction response (FSIR) is generated based on the outcome of the FSI execution. The FSIR may represent an account and/or analysis of results subsequent to the feature switching manager's execution of a FSI. In one or more example approaches, FSI outcomes include: confirmation of the successful implementation of an adjustment, confirmation of the failed implementation of an adjustment, and/or details outlining reasons for errors that were encountered. The FSIR may be transmitted to the SDK platform as a file or data stream, or any other mode of data transfer without departing from what is described herein. Lastly, in Step 718, the FSIR, generated in Step 716, is transmitted to the SDK platform.

In one non-limiting example, an application executing on one of user devices 220 may be configured to use three services. The services are exposed via SDKs 224 and 226 on user device 220. In one example approach, when user device 220 wakes up (e.g., turns on), user device 220 notifies SDK platform 108 that it is planning to use three services. SDK platform 108 contacts the providers of the three services (either directly or indirectly via, for example, a separate command authority) to obtain status and receives a service status report (SSR) from each service provider providing the service. If a service is not available, SDK platform 108 acts accordingly. For instance, if a phone expects a service to be available and it is not, SDK platform 108 instructs user device 220 to turn off the service that is not available. If only aspects of the service are unavailable, SDK platform 108 instructs user device 220 to turn off the aspects of the service that are not available. In one such approach, an FSI is sent to the mobile device to disable the appropriate service or the appropriate aspects of the service. User device 220 then confirms that it turned the feature off (via, for example, an FSIR).

In one example approach, a command authority/SDK platform component 600A, 600B or 600C receives notice from user device 220 of services an application can access. Component 600A, 600B, or 600C requests status of the services from the appropriate service providers and notifies user device 220 if features are to be switched off due to, for instance, unavailable services.

In one particular example, system 100 may determine that, due to some world event, traffic on the fabric will start spiking, potentially overwhelming the system. In such a scenario, a decision might be made to, for example, prevent new mobile applications from coming on line. In some example approaches, such a decision is made by system 100 without input from third party developers. In other example approaches, however, system 100 may rely on the third party application developer to indicate whether a feature or service should be turned on or off; system 100 may then determine if the feature or service will, in fact, be turned on or off.

Figure 8:
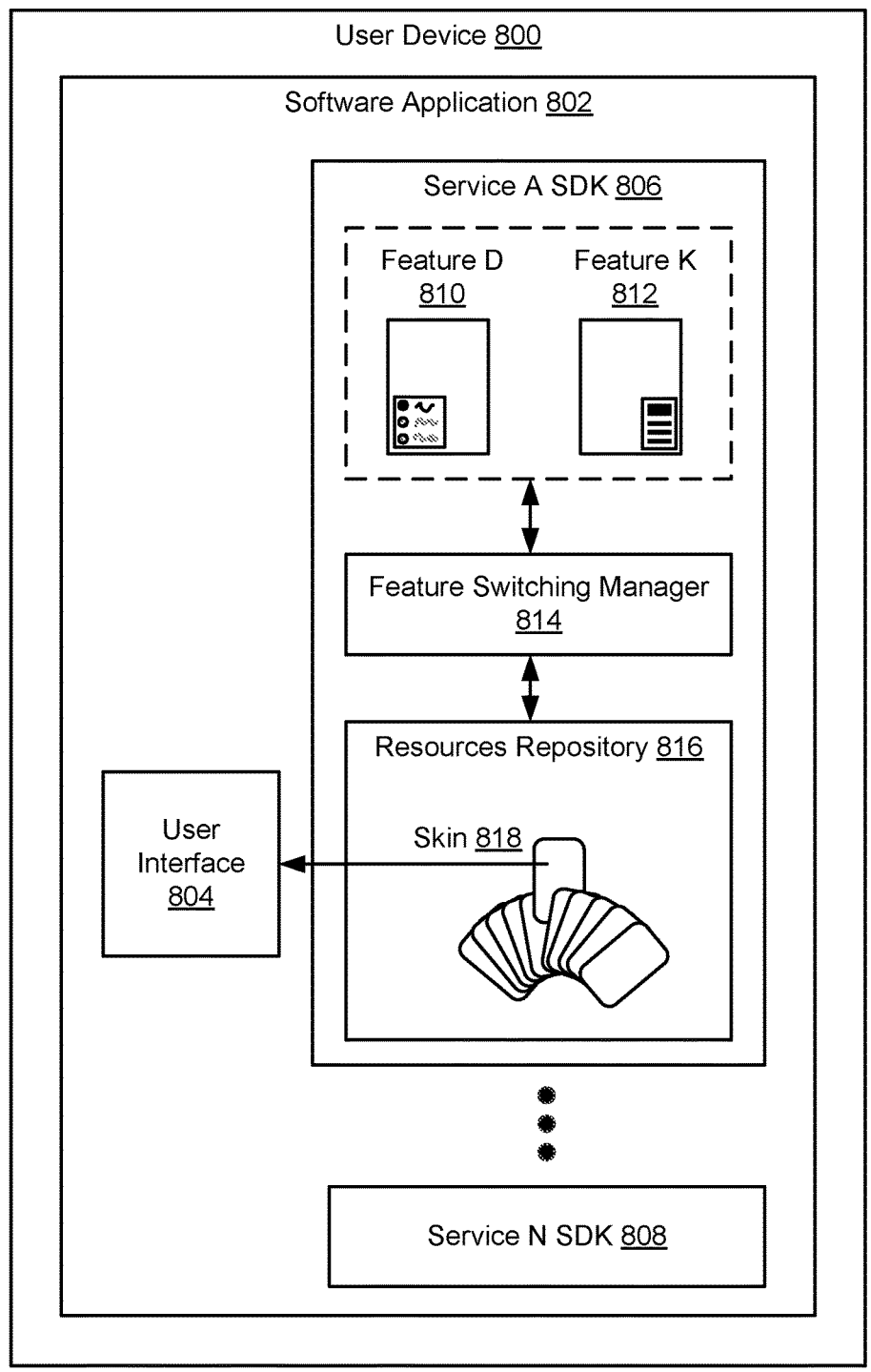
FIG. 8 shows one example of the execution of a feature switching instruction (FSI) on a user device in accordance with one or more aspects of the present disclosure.

The following examples are for explanatory purposes only and not intended to limit the disclosure. FIG. 8 shows one example of the execution of a feature switching instruction (FSI) on a user device in accordance with one or more aspects of the present disclosure. In this example, consider a scenario in which one of a plurality of payment services incorporated into a software application (802) experiences technical difficulties, forcing the corresponding service provider to enact unscheduled downtime of their service. Through the various steps discussed above, a FSI is ultimately received by a user device (800) in response to notification of the downed payment service by the corresponding service provider. More specifically, the FSI is received by the feature switching manager (814) of the service SDK (806) associated with the downed payment service. Accordingly, the feature switching manager (814) processes the FSI to reveal that a user interface (UI) skin index has been included in the FSI. As the presence of this index implies that an adjustment must be made that requires the application of a replacement UI skin (818), the feature switching manager (814) accesses the resources repository (816) in the service SDK (806) of the downed payment service. From there, the feature switching manager (814) uses the provided UI skin index to search for and obtain the corresponding replacement UI skin (818), amongst a plurality of available UI skins, in the resources repository (816). Subsequently, the feature switching manager (814) applies the obtained replacement UI skin (818) onto the user interface (804), where the adjustment of certain features (810, 812) has led to a result which is observable to the end-user. That is to say, a replacement UI skin, opting out access to or use of the downed payment service, by the user, was implemented. In one example approach, the user may still view the downed payment service in the user interface (804), but is unable to select the option. In another example approach, the replacement UI skin (818) does not display any of the payment service, as if the payment service was never offered. Lastly, the feature switching manager (814) accesses the properties (discussed above) associated with the affected features (810, 812) and updates them accordingly.

Figure 9:
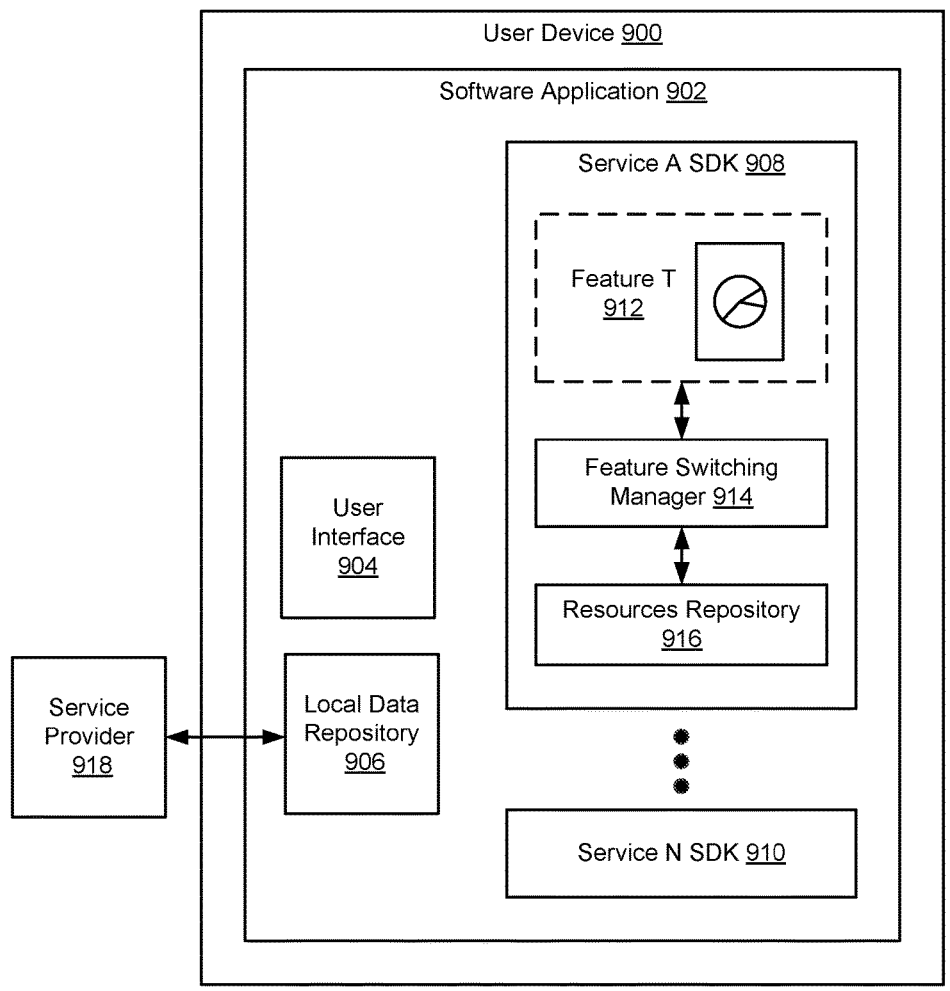
FIG. 9 shows one example of the execution of a feature switching instruction (FSI) on a user device in accordance with one or more aspects of the present disclosure.

FIG. 9 shows one example of the execution of a feature switching instruction (FSI) on a user device in accordance with one or more aspects of the present disclosure. In this example, consider a scenario in which the aggregation of social media is provided by a service implemented in a software application (902). Furthermore, through analytics performed on usage data associated with the software application, a command authority recognizes that the user of the user device (900) is more attentive towards social media deriving from two of the plurality of sources feeding said media. Consequently, a FSI is received by the user device. The feature switching manager (914) belonging to a particular service SDK (908), amongst the plurality of service SDKs (908, 910) on the user device, is the target and proceeds to process the FSI. The result of the processing reveals that the adjustment does not require any resources (e.g., resources repository (916)) to execute the delivered instructions. Aside from this determination, however, processing has also extracted a number of feature and set value pairs. Each pair corresponds to the percentage of the aggregated social media feed each source is to contribute. By way of this example, the aggregate social media feed is to be swayed predominantly by two of the plurality of sources used by the service, whereas the contribution of media pertaining to the remaining sources diminish. Consequently, the feature switching manager (914) requests that the service provider (918) assert the aforementioned contribution changes. Ultimately, the data received by the service provider (918), in response to the request, is then stored in the local data repository (906), and accessed by the software application accordingly. The user, on the other hand, is not made aware of the changes, but experiences better service based on their usage data patterns.

Aspects of the disclosure may be implemented on a computing system. Any combination of mobile, desktop, server, embedded, or other types of hardware may be used. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) may be one or more cores, or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) may be the same as or different from the input device(s). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform what is described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform aspects of the disclosure.

Further, one or more elements of the aforementioned computing system (1000) may be located at a remote location and connected to the other elements over a network (1012). Further, in some example approaches, system 1000 may be implemented on a distributed system having a plurality of nodes, where each aspect of the disclosure may be located on a different node within the distributed system. In example approach, the node corresponds to a distinct computing device. Alternatively, the node may correspond to a computer processor with associated physical memory. The node may alternatively correspond to a computer processor or micro-core of a computer processor with shared memory and/or resources.

In one or more examples, the functions described above may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise random access memory (RAM), read only memory (ROM), electrically erasable programmable read-only memory (EEPROM), compact disc read-only memory (CD-ROM) or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache). Although certain examples are described as outputting various information for display, techniques of the disclosure may output such information in other forms, such as audio, holographical, or haptic forms, to name only a few examples, in accordance with techniques of the disclosure.

While the invention has been described with respect to a limited number of examples, those skilled in the art, having benefit of this disclosure, will appreciate that other example approaches can be devised which do not depart from the scope of what is disclosed herein. Accordingly, the scope of the invention should be limited only by the attached claims.

What is claimed is:

1. A method for feature switching in software applications, comprising:
   receiving, at a device, one or more device-specific feature switching instructions (FSIs) from a software development kit (SDK) platform; and
   for each of the one or more device-specific FSIs:
      determining, by the device and from the respective device-specific FSI, a service SDK identifier, a feature identifier, and a feature set value for the respective device-specific FSI, wherein the respective device-specific FSI identifies a feature within a service SDK as a function of the service SDK identifier and the feature identifier;
      adjusting a set value within application code for a first software application, wherein the set value is associated with the feature identified by the respective device-specific FSI, wherein the set value is adjusted to equal the feature set value in the respective device-specific FSI;
      generating a feature switching instruction response (FSIR) based on an outcome of adjusting the set value; and
      sending the FSIR to the SDK platform.

2. The method of claim 1, wherein adjusting the set value for the respective feature identified by each device-specific FSI comprises selecting one in a group of actions comprising an enablement of the respective feature, a disablement of the respective feature, and applying the feature set value to the respective feature.

3. The method of claim 1, wherein adjusting the set value for the respective feature identified by each device-specific FSI comprises selecting one in a group of actions comprising an enablement of the service provided by the service SDK identified by the SDK identifier of the device-specific FSI and a disablement of a service provided by the service SDK identified by the SDK identifier of the device-specific FSI.

4. The method of claim 1, further comprising installing a feature switching manager in the device, wherein the feature switching manager receives and processes each device-specific FSI received by the device.

5. A device, comprising:
   at least one processor; and
   a computer-readable storage medium storing instructions that, when executed, cause the at least one processor to:
      receive, from an external source, one or more device-specific feature switching instructions (FSIs); and
      for each of the one or more device-specific FSIs:
         determine, from the respective device-specific FSI, a service SDK identifier, a feature identifier, and a feature set value for the respective device-specific FSI, wherein the respective device-specific FSI identifies a feature within a service SDK as a function of the service SDK identifier and the feature identifier;
         adjust a set value within application code for a first software application, wherein the set value is associated with the feature identified by the respective device-specific FSI, wherein the set value is adjusted to equal the feature set value in the respective device-specific FSI;
         generate a feature switching instruction response (FSIR) based on an outcome of adjusting the set value; and
         send the FSIR to the external source.

6. The device of claim 5, wherein the computer-readable storage medium further includes instructions that, when executed, install a feature switching manager in the device, wherein the feature switching manager receives and processes each device-specific FSI received by the device.

7. The device of claim 5, wherein the instructions that cause the at least one processor to adjust the set value for the respective feature identified by each device-specific FSI further cause the at least one processor to selecting one in a group of actions comprising an enablement of the respective feature, a disablement of the respective feature, and applying the feature set value to the respective feature.

8. The device of claim 5, wherein the instructions that cause the at least one processor to adjust the set value for the respective feature identified by each device-specific FSI further cause the at least one processor to select one in a group of actions comprising an enablement of the service provided by the service SDK identified by the SDK identifier of the device-specific FSI and a disablement of a service provided by the service SDK identified by the SDK identifier of the device-specific FSI.

9. A non-transitory computer-readable storage medium storing instructions that, when executed, cause at least one processor of a device to:
   receive, from an external source, one or more device-specific feature switching instructions (FSIs); and
   for each of the one or more device-specific FSIs:
      determine, from the respective device-specific FSI, a service SDK identifier, a feature identifier, and a feature set value for the respective device-specific FSI, wherein the respective device-specific FSI identifies a feature within a service SDK as a function of the service SDK identifier and the feature identifier;
      adjust a set value within application code for a first software application, wherein the set value is associated with the feature identified by the respective device-specific FSI, wherein the set value is adjusted to equal the feature set value in the respective device-specific FSI;
      generate a feature switching instruction response (FSIR) based on an outcome of adjusting the set value; and
      send the FSIR to the external source.

10. The non-transitory computer-readable storage medium of claim 9, wherein the instructions further cause the at least one processor to install a feature switching manager in the device, wherein the feature switching manager receives and processes each device-specific FSI received by the device.

11. The non-transitory computer-readable storage medium of claim 9, wherein the instructions that cause the at least one processor to adjust the set value for the respective feature identified by each device-specific FSI further cause the at least one processor to selecting one in a group of actions comprising an enablement of the respective feature, a disablement of the respective feature, and applying the feature set value to the respective feature.

12. The non-transitory computer-readable storage medium of claim 9, wherein the instructions that cause the at least one processor to adjust the set value for the respective feature identified by each device-specific FSI further cause the at least one processor to select one in a group of actions comprising an enablement of the service provided by the service SDK identified by the SDK identifier of the device-specific FSI and a disablement of a service provided by the service SDK identified by the SDK identifier of the device-specific FSI.

* * * * *